US012569964B1

(12) United States Patent
Smith

(10) Patent No.: US 12,569,964 B1
(45) Date of Patent: Mar. 10, 2026

(54) UNION RELEASE TOOL

(71) Applicant: Reilly Swafford Smith, Springfield, OH (US)

(72) Inventor: Reilly Swafford Smith, Springfield, OH (US)

( * ) Notice: Subject to any disclaimer, the term of this patent is extended or adjusted under 35 U.S.C. 154(b) by 394 days.

(21) Appl. No.: 18/111,494

(22) Filed: Feb. 17, 2023

Related U.S. Application Data

(60) Provisional application No. 63/429,613, filed on Dec. 2, 2022, provisional application No. 63/311,392, filed on Feb. 17, 2022.

(51) Int. Cl.
*B25B 5/00* (2006.01)
*B25B 23/00* (2006.01)
*B25B 27/02* (2006.01)

(52) U.S. Cl.
CPC ........ *B25B 27/023* (2013.01); *B25B 23/0078* (2013.01)

(58) Field of Classification Search
CPC .... B25B 5/00; B25B 5/02; B25B 5/04; B25B 27/00; B25B 27/14
See application file for complete search history.

(56) References Cited

U.S. PATENT DOCUMENTS

| | | | | |
|---|---|---|---|---|
| 1,172,761 | A * | 2/1916 | Berskstresser | B25B 27/023 29/259 |
| 5,557,992 | A * | 9/1996 | Macor | B25B 13/56 81/124.5 |
| 9,103,405 | B2 * | 8/2015 | Smetz | F16B 39/12 |
| 12,215,756 | B2 * | 2/2025 | Mollick | B60P 7/083 |
| 2007/0068345 | A1 * | 3/2007 | Flud | E21B 19/163 81/57.19 |
| 2010/0011915 | A1 * | 1/2010 | Badger | B25G 1/005 81/60 |
| 2021/0215006 | A1 * | 7/2021 | Johnson | B25B 21/002 |
| 2021/0379715 | A1 * | 12/2021 | Narayan | F16B 5/0225 |

* cited by examiner

*Primary Examiner* — Lee D Wilson
(74) *Attorney, Agent, or Firm* — The Law Office of Patrick F. O'Reilly III, LLC

(57) ABSTRACT

A union release tool for loosening union nuts is disclosed herein. The union release tool includes a nut capturing device with a slip-on capturing member for circumscribing a plurality of sides of a union nut, the nut capturing device configured to provide an extended pivot point relative to the rotation of the union nut; a jack assembly configured to produce a force for breaking the union nut loose, the jack assembly being operatively coupled to the nut capturing device so as to convert the force produced by the jack assembly to a torque applied to the union nut; and at least one reactionary device configured to resist the force applied by the jack assembly to facilitate the breaking of the union nut loose, and the at least one reactionary device defining at least one pipe capturing recess for receiving a portion of a pipe in the pipe capturing recess.

20 Claims, 14 Drawing Sheets

UNION RELEASE TOOL

CROSS-REFERENCE TO RELATED APPLICATIONS

This patent application claims priority to U.S. Provisional Patent Application No. 63/311,392, entitled "Union Release Tool", filed on Feb. 17, 2022, and U.S. Provisional Patent Application No. 63/429,613, entitled "Union Release Tool", filed on Dec. 2, 2022, the disclosure of each of which is hereby incorporated by reference as if set forth in its entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to the disassembly of a union fitting. More particularly, the invention relates to a mechanical device that is configured to capture the nut of a union and react against another pipe or nut to provide torque to break the original nut loose.

2. Background

A union is a pipe coupling that is intended for more than one use. It is intended to be installed, disassembled and reinstalled without causing deformation to the pipes, gaskets, or fasteners. For unions in the field, corrosion can cause the threads of the nut to become locked to the threads of the fitting. The required torque to release the nut is therefore much greater than the original torque put on the nut during installation. Some applications can carry and manage highly flammable medium. An example would be a natural gas meter installation. Many installations remain in the field untouched for years, maybe decades. The unions at the top of these meters are intended to allow disassembly of the pipes to the meter while maintaining the integrity of the entire system. A system that does not depend upon any outside energy forces, such as electrical, hydraulic, pneumatic would be beneficial to reduce the risk associated with work on unions integrated into a volatile medium. To maintain this integrity is to be able to remove the union without destruction to any part of the assembly. The high torque required to remove the nut must be applied without causing harm to the mechanical system or putting the person removing the union in any danger or possibility of injury.

Therefore, what is needed is a union release tool that provides a means to apply large amounts of controlled torque to the nut using simple minimal operator energy. Moreover, a union release tool is needed that results in a safer working environment by enabling the nut's release with little physical effort in a controlled manner without any hazardous energy sources.

BRIEF SUMMARY OF EMBODIMENTS OF THE INVENTION

Accordingly, the present invention is directed to a union release tool for loosening a union nut that substantially obviates one or more problems resulting from the limitations and deficiencies of the related art.

In accordance with one or more embodiments of the present invention, there is provided a union release tool for loosening union nuts. The union release tool includes a nut capturing device, the nut capturing device including a slip-on capturing member for circumscribing a plurality of sides of a union nut, the nut capturing device configured to provide an extended pivot point relative to the rotation of the union nut; a jack assembly, the jack assembly configured to produce a force for breaking the union nut loose, and the jack assembly being operatively coupled to the nut capturing device so as to convert the force produced by the jack assembly to a torque applied to the union nut; and at least one reactionary device, the at least one reactionary device configured to resist the force applied by the jack assembly to facilitate the breaking of the union nut loose, and the at least one reactionary device defining at least one pipe capturing recess for receiving a portion of a pipe in the pipe capturing recess.

In a further embodiment of the present invention, the nut capturing device further comprises an end piece that captures the remaining sides of the union nut that are not captured by the slip-on capturing member.

In yet a further embodiment, the nut capturing device further comprises a fork attached to the slip-on capturing member and one or more V-blocks supported on the fork, the one or more V-blocks configured to receive a component of the jack assembly.

In still a further embodiment, the slip-on capturing member of the nut capturing device is in a form of a plate with a plurality of spaced-apart apertures disposed through the plate, and the plurality of spaced-apart apertures in the plate define a plurality of respective extended pivot points relative to a rotation of the union nut.

In yet a further embodiment, the jack assembly is in a form of a screw jack assembly, the screw jack assembly configured to produce a linear output force as a result of a rotational input force, the screw jack assembly including a threaded rod, a plurality of threaded dowels for pivots, and a thrust bearing.

In still a further embodiment, the threaded rod of the screw jack assembly comprises a first drive end and an oppositely disposed second end, and the threaded rod is configured to be rotated with a ratchet or wrench applied to the first drive end of the threaded rod.

In yet a further embodiment, the at least one reactionary device comprises a first elongate member telescopically received in a second elongate member so as to allow the at least one reactionary device to accommodate various pipe spacing.

In still a further embodiment, the linear output force generated by the screw jack assembly results in the first and second elongate members of the at least one reactionary device rotating relative to one another, thereby causing the first and second elongate members of the at least one reactionary device to lock together.

In yet a further embodiment, the jack assembly is in a form of a hydraulic jack assembly, the hydraulic jack assembly configured to produce the force for breaking the union nut loose, and the hydraulic jack assembly being operatively coupled to the nut capturing device so as to convert the force produced by the hydraulic jack assembly to the torque applied to the union nut.

In still a further embodiment, the at least one reactionary device is configured to grasp two pipes of an item being serviced while self-locking into place as external forces are applied, the at least one reactionary device being ambidextrous such that the at least one reactionary device is able to provide a reactionary force in opposite directions as needed in an application.

In yet a further embodiment, the union release tool further comprises a quick-adjust nut, a spring, or bungee cord to assist in keeping reaction arms of the at least one reactionary device together, the quick-adjust nut, spring or bungee cord configured to apply force to encourage a binding of the reaction arms.

In still a further embodiment, the at least one reactionary device comprises a first plate member and a second plate member, wherein the first and second plate members are configured to capture respective pipes on oppositely disposed sides to maintain a grip on the pipes while reactionary forces are applied on either side of the at least one reactionary device.

In yet a further embodiment, the at least one reactionary device includes a reaction arm configured to be disposed between one or more nuts and a pipe of an item being serviced that has one or more unions, and the at least one reactionary device further including an adjustable locator to allow for different nut orientations and supports to manage the forces needed to break the union nut loose.

In still a further embodiment, the at least one reactionary device comprises a right nut reactionary device and a left nut reactionary device, the right nut reactionary device configured to be used for breaking a union nut loose on a right side of the item being serviced, and the left nut reactionary device configured to be used for breaking a union nut loose on a left side of the item being serviced.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
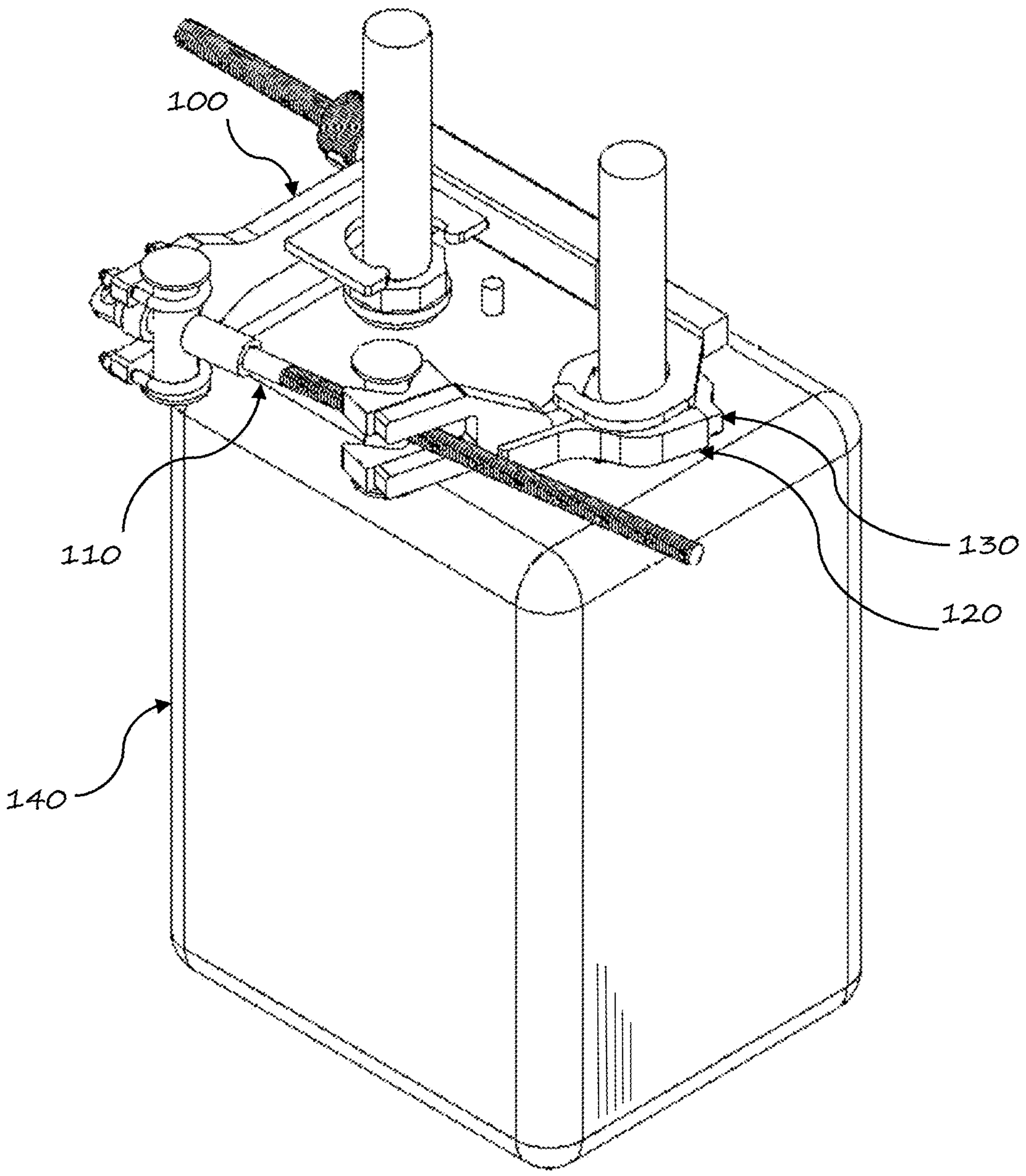
FIG. 1 is a perspective view showing all components of a union release tool and a filter (or meter) on which the union release tool may be used, according to a first illustrative embodiment of the invention, wherein the union release tool is installed to release a right nut.

In accordance with a first illustrative embodiment, there is provided a union release tool for applying up to 2,500 ft.-lbs. of torque to a locked union nut. The tooling can be configured to address multiple size nuts/assemblies. Experience has shown that breaking the nuts loose can take more force than a person can safely use a wrench. The screw jack also allows for a wide angle of nut rotation. The nut can only be captured relative to the flats on the nut. This dictates the location of the arm of the nut capturing device. Because breaking the nuts loose is to turn them counter-clockwise, the push or pull provided by the screw jack can provide forces in both directions. The union release tool includes a capturing device for the nut to be broken loose, a screw jack to provide force, two reaction arms to capture the piping and assembly of the meter relative to each nut with an adjustable sliding link to allow for various spreads of pipe centerlines and nut sizes and a ratchet or other lever to operate the screw jack. Again, the tooling requires no additional energy source. The union release tool assembly is configured to attach to the nut and provide minimal operator mechanical force that will transfer to amplified torque to break the nut loose. Because the tool reacts against itself, the nuts and the piping, minimal stress is put on the mounting of the meter or device. In FIG. 1, the tooling is shown releasing the right nut of an assembly. The nut capturing device is attached to the right nut. The appropriate nut adapter is matched to the size nut being removed. The reaction arm is configured to push the nut capturing device, thus rotating the nut counter-clockwise.

In the first illustrative embodiment, a union removal tool is used to break the nuts of unions loose without compromising the integrity of the union, the surrounding piping and threads in a safe, stable, and controlled manner. The union removal tool generally comprises a nut capturing device used with a screw jack assembly in conjunction with a torque reaction arm. The operator provides a minimal effort to turn the screw jack which is held at one end by the torque reaction arm and either pulling or pushing on the nut capturing device's V-blocks. No additional external energy sources are required. All four components are used in different configurations to break the left or right nut loose. The operation of the screw jack provides the force to the nut capturing device to produce torque on the nut while reacting against itself. Different size end caps enable multiple size nuts to be addressed with the same tooling.

In the first illustrative embodiment, the union removal tool comprises an adjustable torque reaction arm capable of spanning and capturing different diameter and spread of pipes feeding a filter or meter. The adjustable torque reaction arm includes one or more U-bolts to hold a fixed dowel of a screw jack assembly and a quick-adjust nut providing a lockable span. The union removal tool further comprises a screw jack assembly, capable of producing high linear output force with minimal rotational input force. The screw jack assembly comprises a threaded rod, threaded dowels for pivots, and a thrust bearing. The union removal tool further comprises a nut capturing device, the nut capturing device including a slip-on lockable capturing device, an extended pivot point relative to the rotation of the nut, and an end cap that captures the remaining sides of the nut and provides the filler for smaller sized nuts. In the first illustrative embodiment, forks and V-blocks on the nut capturing device ease the installation and assembly of the tool, while managing the push and pull forces required to use the parts configured as needed. The split fork design allows for assembly to be installed in one plane. Quick management of the threaded rod of the screw jack assembly can be accomplished with the aid of a ratchet and socket at the drive end and a knob at the open end. The adjustable torque reaction arm includes plates that are configured to capture each pipe from each side to maintain a grip on the pipes while reactionary forces can be applied on either side of the adjustable torque reaction arm. With the adjustable torque reaction arm, a shaft is slid into a tube with forces generated by the screw jack to rotate the two relative to one another, causing the two components to lock together. Some play between the two components is needed to encourage this locking effect. Both components will experience rotational forces relative to the same plane causing the two components to lock together. Other ways of locking the reaction arms together include knowing the distance between the two pipes and pinning them (or other form of mechanical mating) that would maintain the proper spacing between the two plates that capture the pipes.

The first illustrative embodiment of a union release tool is shown in FIG. 1. In the first illustrative embodiment, the union release tool generally comprises a torque reaction arm 100, an Acme screw jack 110, a nut capturing device 120, and an end cap 130. In FIG. 1, the union release tool is shown ready to release a right nut of a filter 140 (the union release tool is equally useful for unions at the top of a meter, such as a gas meter). It is worth noting the position of the torque reaction arm 100, adjustable dowel 118 of the Acme screw jack 110, and nut capturing device 120 in FIG. 1. The adjustable dowel 118 is located between the V-blocks 123 with the Acme threaded rod 113 between the tines of the fork 122 of the nut capturing device 120. The appropriate size end cap 130 is used for a tight fit on the nut. Rotating the Acme threaded rod 113 counter-clockwise will push the adjustable dowel 118 away from the fixed dowel 117 causing the nut capturing device 120 to turn the right nut counter-clockwise. In the illustrative embodiment, the union release tool is capable of applying up to 2,500 ft.-lbs. of torque to a locked union nut.

Figure 2:
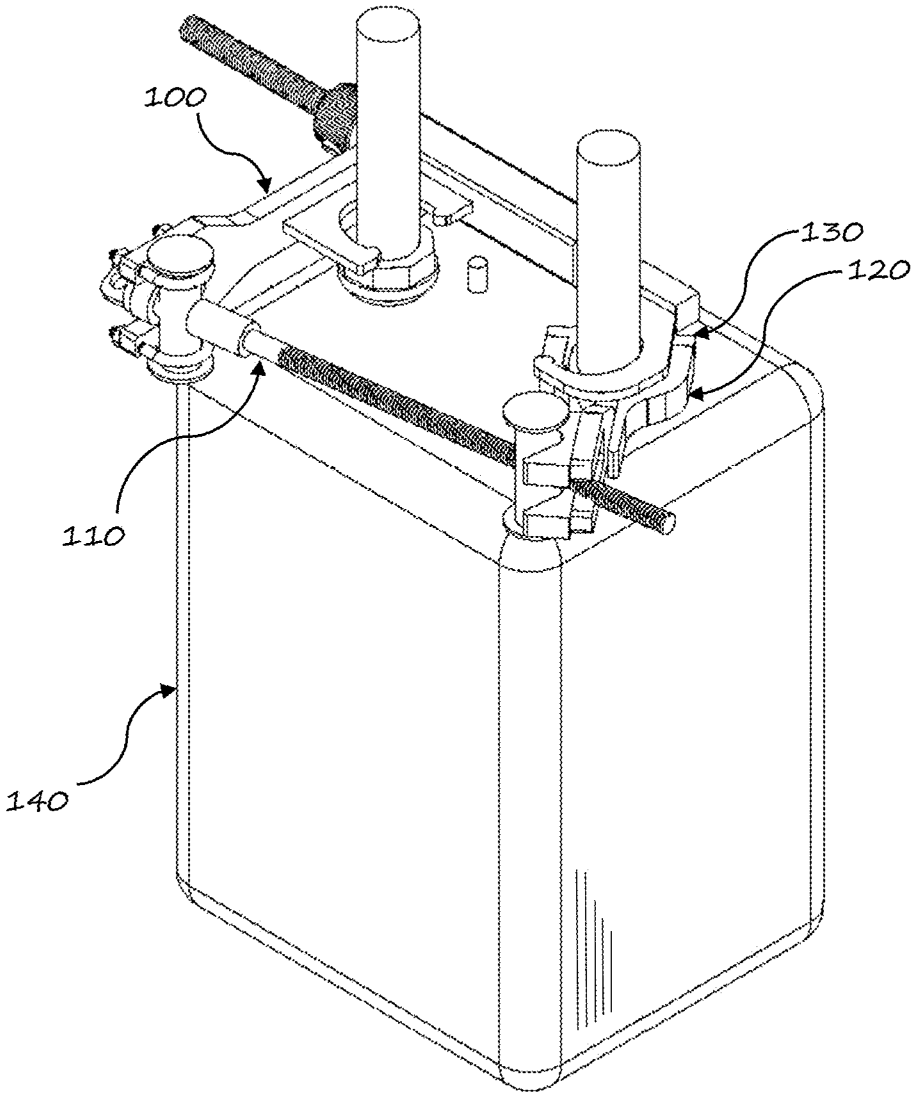
FIG. 2 is a perspective view showing the union release tool of FIG. 1 releasing a right nut by moving it in the counter-clockwise direction.

In FIG. 2 of the illustrative embodiment, the nut capturing device 120 is shown moved in the counter-clockwise direction. More particularly, in FIG. 2, the components of the union release tool are shown releasing a right nut. The Acme threaded rod 113 has been rotated counter-clockwise, causing the adjustable dowel 118 to push the nut capturing device 120, thus rotating the right nut counter-clockwise and breaking it loose.

Figure 3:
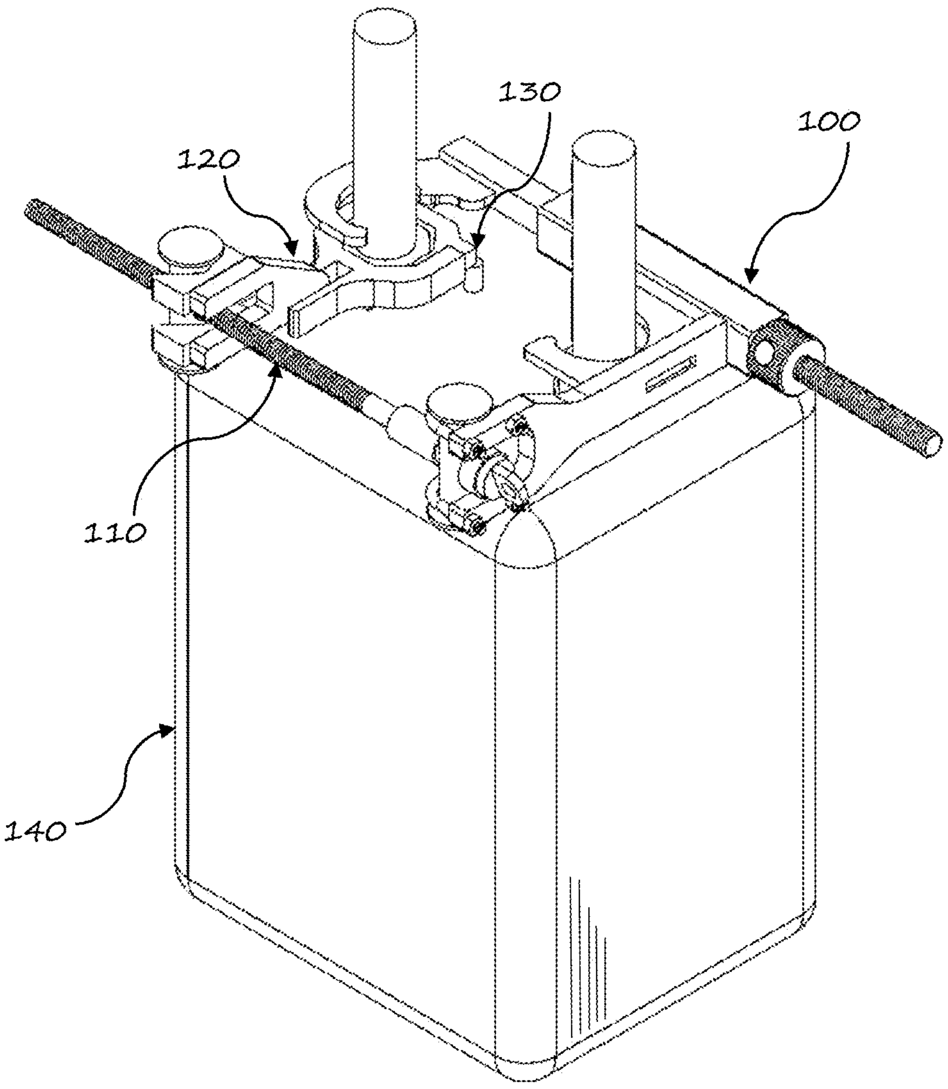
FIG. 3 is a perspective view showing the union release tool of FIG. 1 being installed to release a left nut.

In FIG. 3 of the illustrative embodiment, the nut capturing device 120 is shown on the left nut. The reaction arm 100 is inverted, thus pulling on the nut capturing device 120 to rotate the left nut in the counter-clockwise direction. More particularly, in FIG. 3, the components of the union release tool are shown releasing a left nut. The Acme threaded rod 113 is slipped between the tines of the fork 122 of the nut capturing device 120 and the adjustable dowel 118 is centered in the V-blocks 123. Rotating the Acme threaded rod 113 clockwise will pull the adjustable dowel 118 closer to the fixed dowel 117, pulling the nut capturing device 120 causing the left nut to be rotated counter-clockwise and breaking the nut loose.

Figure 4:
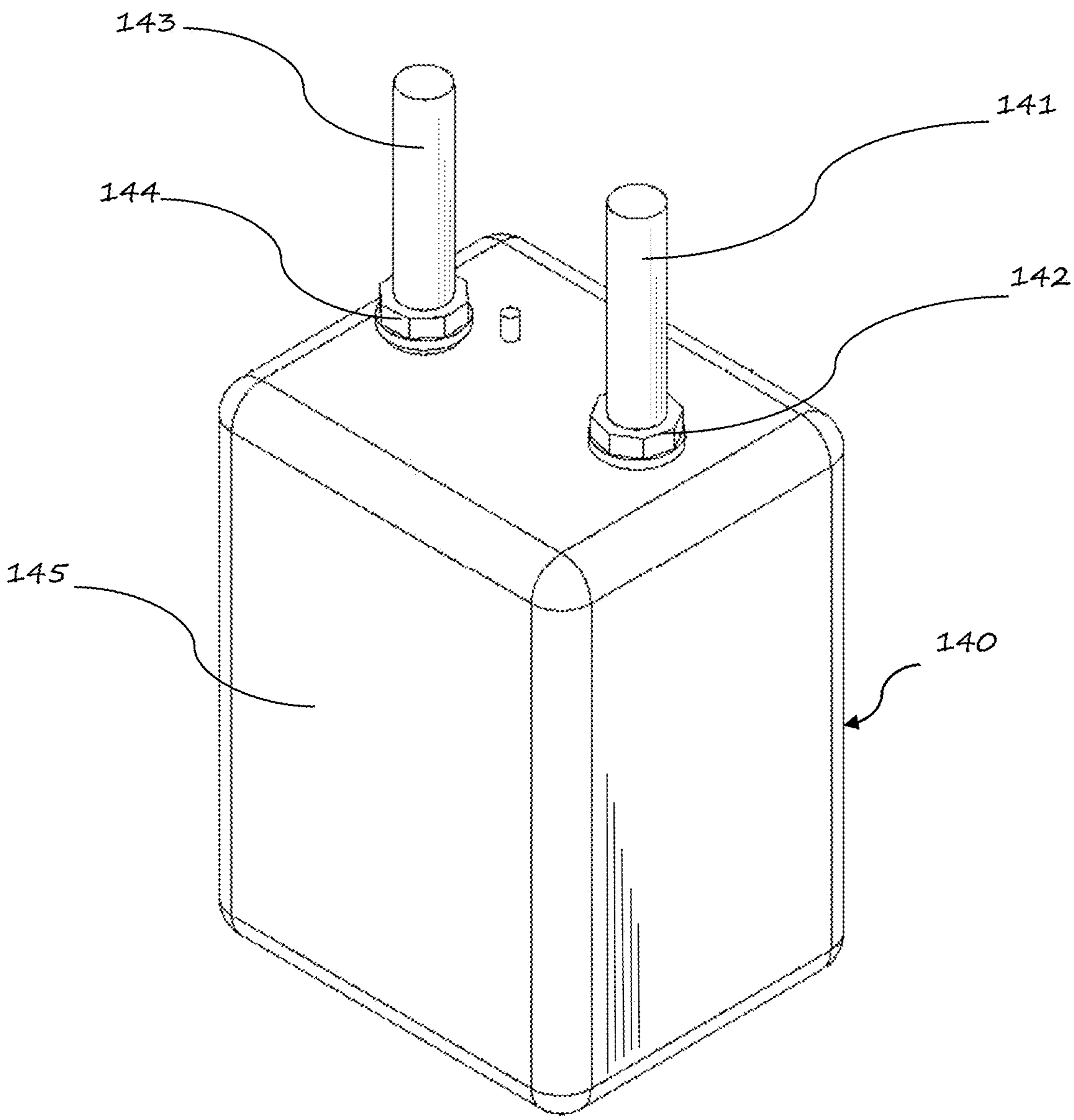
FIG. 4 is a perspective view of an example filter (or meter)

In FIG. 4 of the illustrative embodiment, the items that make up a general meter or filter are shown. More particularly, in FIG. 4, the filter assembly 140 comprises the filter body 145, the right tube 141, the right union 142, the left tube 143, and the left union 144. In other embodiments, the device body 145 could be a body of a meter, test station or any other device with inlet and outlet union connections (i.e., any item being serviced in the pipe system).

Figure 5:
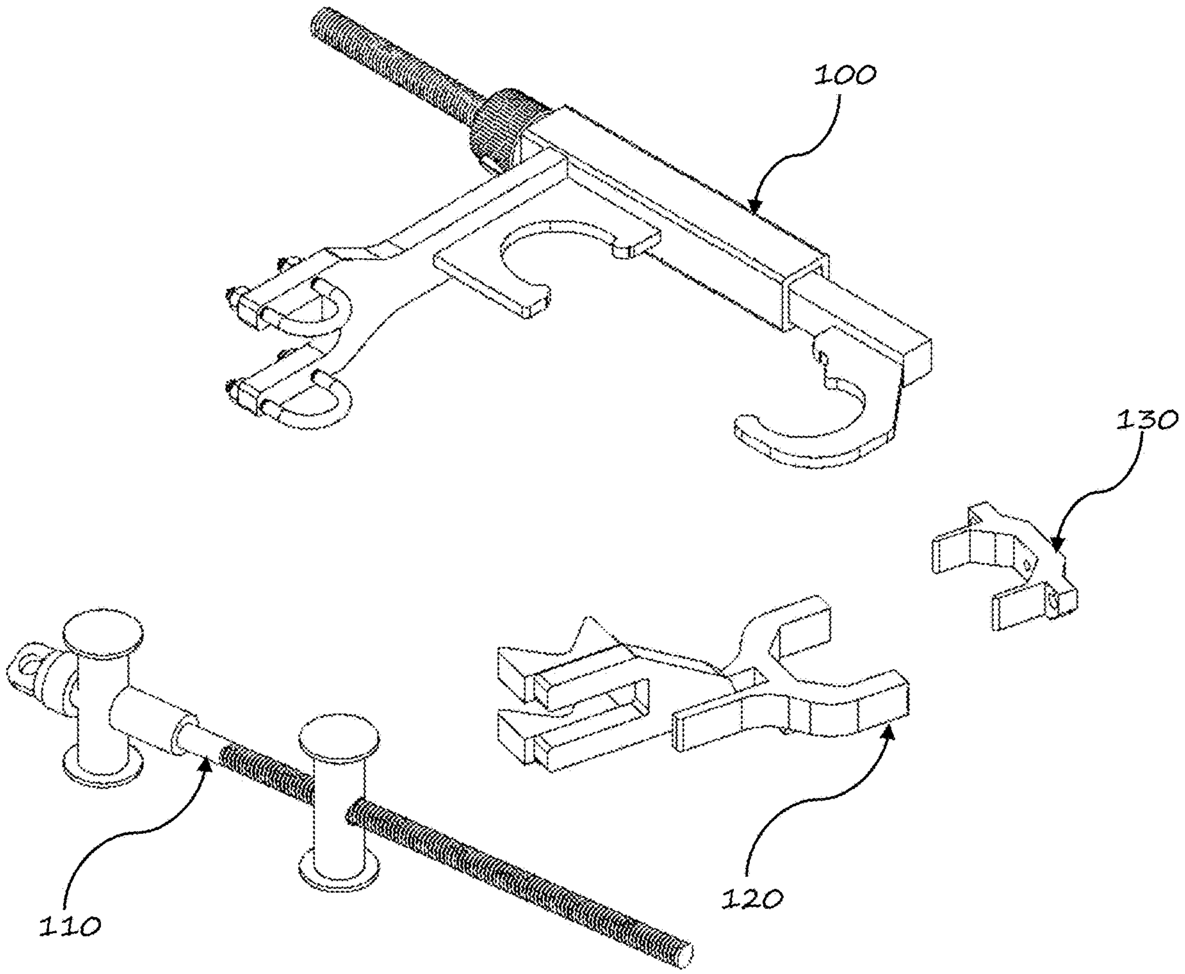
FIG. 5 is a perspective view of all the items of the union release tool of FIG. 1 that are used to break a union loose.

In FIG. 5 of the illustrative embodiment, the items of the union release tool that are used to break a union loose are shown. More particularly, in FIG. 5, the components of the union release tool that are used to release the unions are the torque reaction arm 100, the Acme screw jack 110, the nut capturing device 120, and the end cap 130.

Figure 6:
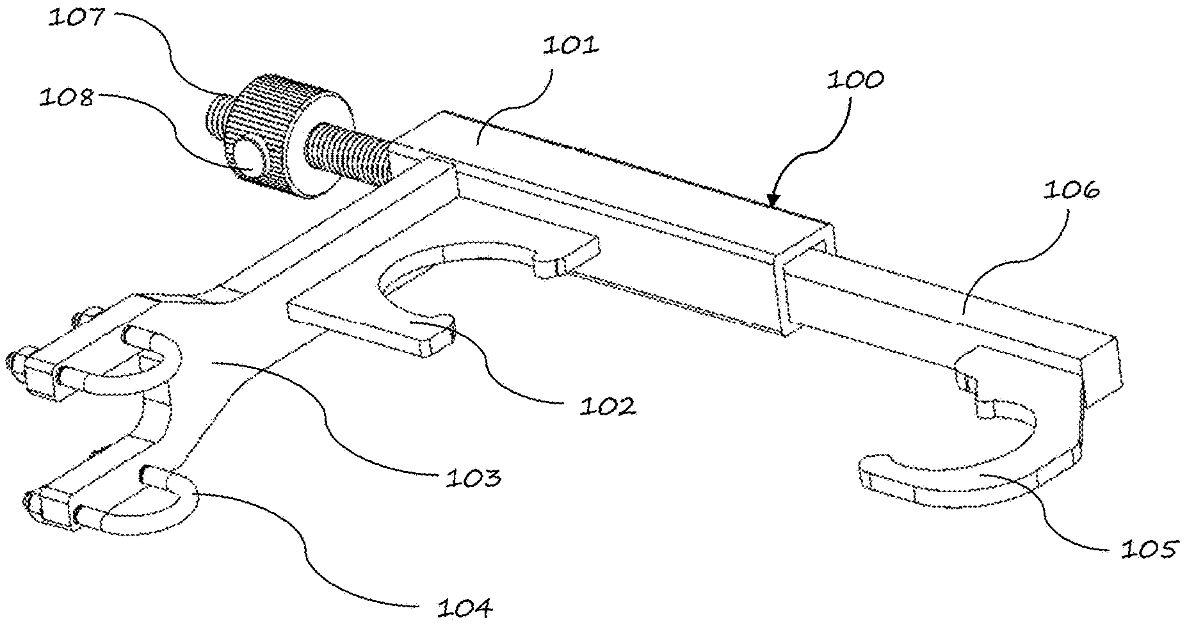
FIG. 6 is a perspective view of a torque reaction arm of the union release tool of FIG. 1.

In FIG. 6 of the illustrative embodiment, the reaction arm assembly 100 is shown in detail. The reaction arm assembly 100 holds the fixed dowel 117 of the Acme threaded rod 113. The assembly 100 also captures both pipes of the filter or meter 140. One capturing end is adjustable to manage different spreads on the unit's nuts. A quick adjust threaded fastener allows for sure and proper fit on the nut spread. As shown in FIG. 6, in the illustrative embodiment, the torque reaction arm 100 includes the slide tube 101, the first pipe capturing plate 102 with a first pipe capturing recess, the fork arm 103, the U-bolts 104, the second pipe capturing plate 105 with a second pipe capturing recess, the slide bar 106, the threaded rod 107, and the quick-adjust nut 108. Advantageously, the reaction arm assembly 100 can be used one way to break the right nut loose and inverted to break the left nut loose.

In the illustrative embodiment, referring again to FIG. 6, the fork arm 103 of the reaction arm assembly 100 is welded perpendicular to the slide tube 101, and the machined first plate 102 is configured to capture one of the item's pipes. The fork arm 103 is large enough to accommodate the screw jack and can have mounting holes for U-bolts 104.

In the illustrative embodiment of FIG. 6, slide bar 106 slips into the slide tube 101 completing the reactionary coupling to the two pipes. In the illustrative embodiment of FIG. 6, the second pipe capturing plate 105 is configured to slip over and around either pipe and rides on top of the nut capturing device 120. In the illustrative embodiment, the engagement between the slide bar 106 and the slide tube 101 is used to make this self-locking device. In other embodiments, the use of a linear ratchet, a pin to locate the rod and tube, or any other means can be used. In the illustrative embodiment, the slide bar 106 is slid into the slide tube 101 with forces generated by the screw jack to rotate the two relative to one another, causing the two to lock together. Some play between the two is required to encourage this locking effect. Both will experience rotational forces relative to the same plane causing the two to lock together. Other ways of locking the reaction arms together is to know the distance between the two pipes and pin them (or other form of mechanical mating) that would maintain the proper spacing between the two plates that capture the pipes.

Figure 7:
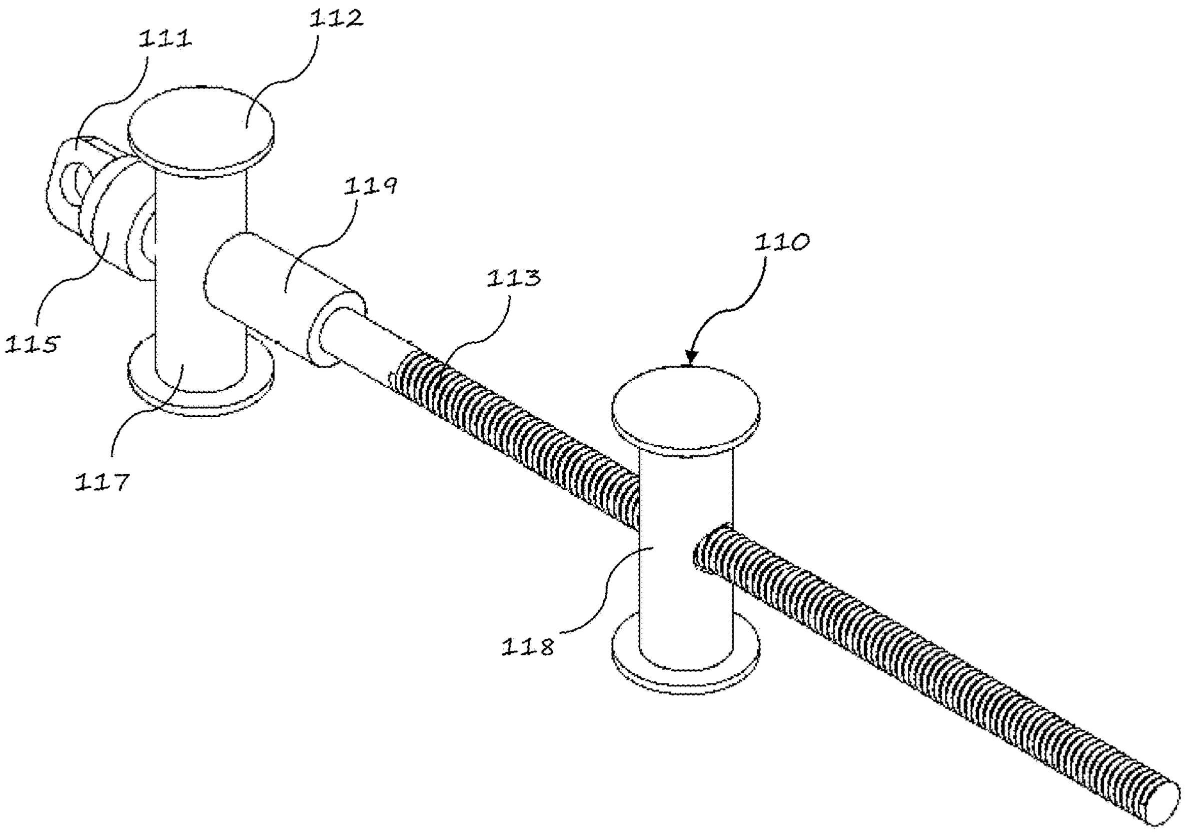
FIG. 7 is a perspective view of the screw jack assembly of the union release tool of FIG. 1, which includes an Acme threaded rod.

In FIG. 7 of the illustrative embodiment, the screw jack assembly 110 is shown. The screw jack assembly 110 comprises an Acme threaded rod 113, a rotational input device 111 to rotate the rod 113 (e.g., a hex drive or clearance hole for rod), two threaded dowels 112, one 117 fixed to the threaded rod 113 and an adjustable one 118 that can travel the length of the threaded rod 113. The screw jack assembly 110 also comprises a spacer member 119 to keep the threaded rod 113 separated from the fixed dowel 117, a thrust bearing 115 to allow easy turning of the threaded rod 113. In the illustrative embodiment, the screw jack and fixed dowel 117 are attached to the fixed end of the reaction arm 100 with U-bolts 104 or similar mounting. The screw jack assembly 110 is held, but is allowed to swivel and tilt. This swivel and tilt allows the jack 110 to push or pull on the nut capturing device 120 while maintaining a perpendicular force to the adjustable dowel 118.

Referring again to the screw jack assembly 110 in FIG. 7, it can be seen that the fixed dowel 117 is located closest to the rotational input device 111. Holding the fixed dowel 117 and rotating the Acme threaded rod 113 counter-clockwise will move the adjustable dowel 118 away from the fixed dowel 117. Holding the fixed dowel 117 and rotating the Acme threaded rod 113 clockwise will cause the adjustable dowel 118 to move towards the fixed dowel 117.

In the illustrative embodiment of FIG. 7, the rotational input device or adapter 111 is in a form of a plate-like structure with a hole concentric and perpendicular to the threaded rod 113, yet can be replaced with a hex head or a square drive that would enable a ratchet to be used to turn the threaded rod 113. In the illustrative embodiment of FIG. 7, the threaded rod 113 passes through the fixed dowel 117 and is rotated by item 111. Advantageously, the screw jack 110 is capable of producing a high linear output force with minimal rotational input force by the user.

Figure 8:
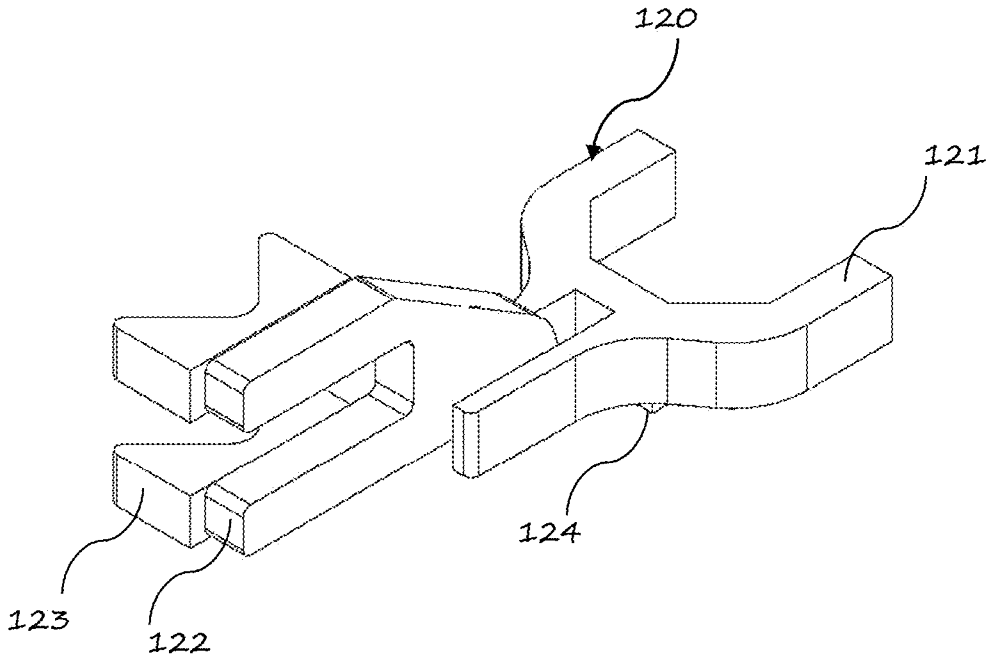
FIG. 8 is a perspective view of a nut capturing device of the union release tool of FIG. 1.

In FIG. 8 of the illustrative embodiment, the nut capturing device 120 is shown. As shown in FIG. 8, the nut capturing device 120 includes the five-sided nut housing 121 (i.e., a slip-on capturing member), the V-block fork 122, V-blocks 123, and the lower nut capture tab 124. In the illustrative embodiment, the five-sided nut housing 121 of the nut capturing device 120 is in a form of a five-sided wrench that fits the largest nut the tool is capable of attaching to. Interchangeable end caps 130 (see FIG. 9) complete the capture of the nut (holes for threaded fasteners are shown in the illustrative embodiment, but a drop-in plate or similar method can be used). An approximately 6 inch lever is combined into the side of the wrench that converts the force applied to torque on the nut. As shown in FIG. 8, a split fork 122 holds the V-blocks 123, thus allowing the threaded rod 113 to slip between them and capture the adjustable threaded dowel. It also enables the threaded rod 113 to be attached from a pushing or pulling position.

Turning again to FIG. 8, the fork 122 maintains the spacing of the V-blocks 123 and allows the threaded rod 113 to slip between the V-blocks 123 and capture the adjustable dowel 118, the five-sided open end wrench 121 that will tie to the nut, and an undercarriage vertical capturing tab 124 that aids in holding the device 120 to the nut.

Figure 9:
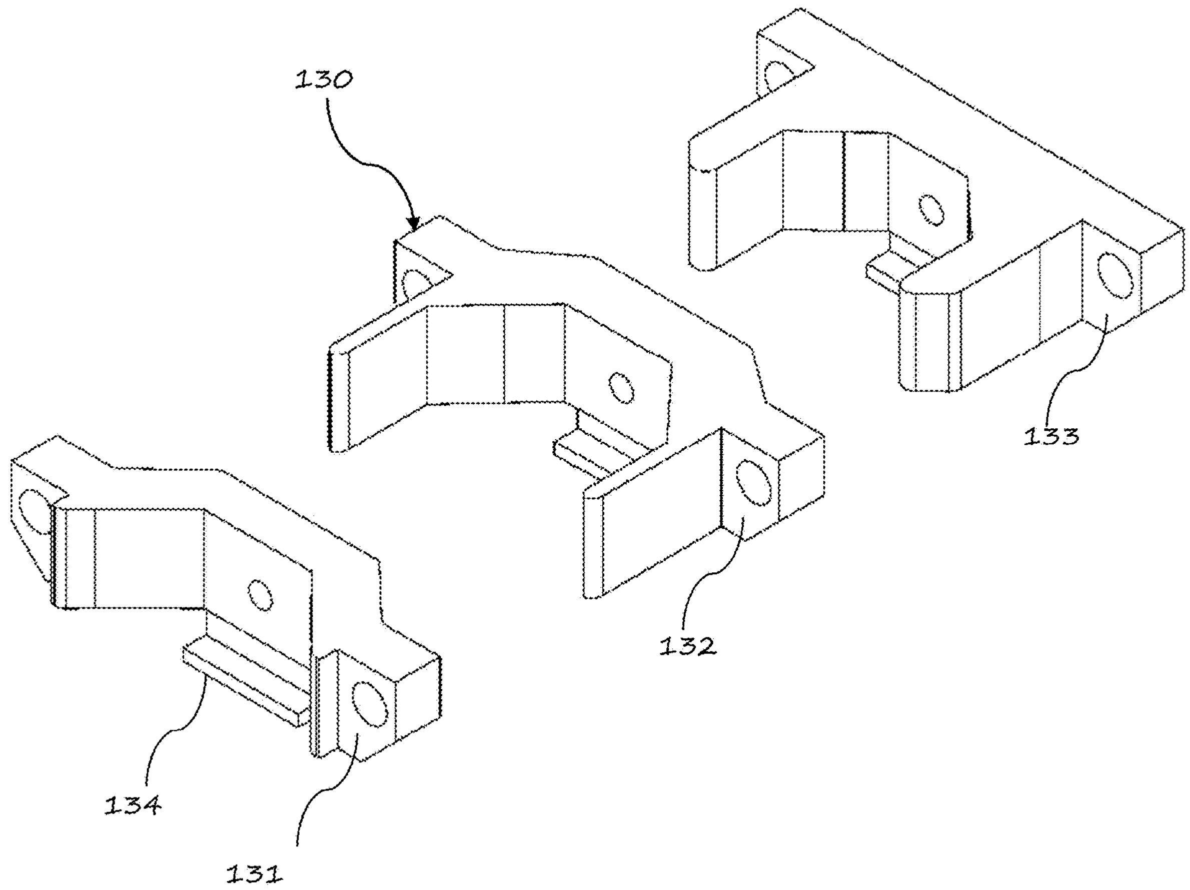
FIG. 9 is a perspective view of various end caps of the union release tool of FIG. 1.

In FIG. 9 of the illustrative embodiment, the end caps 130 are shown. Multiple size end caps 130 allow the system to match up to different sized nuts and assemblies. More particularly, in FIG. 9, various end caps 130 are shown, including a largest nut end cap 131, a middle nut end cap 132, and a smallest nut end cap 133. In the illustrative embodiment, each end cap 131, 132, 133 includes a lower nut capture tab 134.

Exemplary Operation of the First Embodiment

Now, an example of the operation of the first illustrative embodiment of the union release tool will be described. First, the user installs the nut capturing device 120 to either unit nut (e.g., initially on the right nut in this example). The user ensures the nut is completely captured by the nut capturing device 120 with the appropriate end cap 130 secured, and the undercarriage vertical capturing tabs 124, 134 under the nut (i.e., the user verifies that both lower tabs 124, 134 have captured the nut from below). During the installation process, the nut capturing reaction arm 100 always lands on top of the nut capturing device 120. Then, the user loosens the quick-adjust nut 108 to allow enough play in the torque reaction arm 100 to span and capture both pipes. After which, the user slips the torque reaction arm 100 behind the pipes to capture them from the rear. Then, the user tightens the quick-adjust nut 108 to remove the play, and snugly engage the pipe capturing plates 102, 105 with the pipes. Next, the user spins the adjustable dowel 118 to clear the tines of the fork 122 to the inside on the nut capturing device 120 relative to the V-blocks 123. Depending upon which nut is being broke loose, the adjustable dowel 118 may need to be turned clockwise or counter-clockwise. Once clear, the user slips the threaded rod 113 between the tines of the fork 122 of the nut capturing device 120. The user then turns the Acme threaded rod 113 counter-clockwise to nest the adjustable dowel 118 into the V-blocks 123. After which, the user takes up any slack in the system by turning the threaded rod 113 by means of the rotational input device 111. With all the slack mitigated, the user uses a ratchet or wrench to rotate the threaded rod 113 by means of the rotational input device 111. The union nut can be observed rotating counter-clockwise, thus breaking it loose. Once loose, the user removes all parts of the tool, installs the nut capturing device 120 on the other nut, flips the reaction arms over, and repeats the process in the opposite direction to loosen the other nut (see FIGS. 2 and 3).

Figure 10:
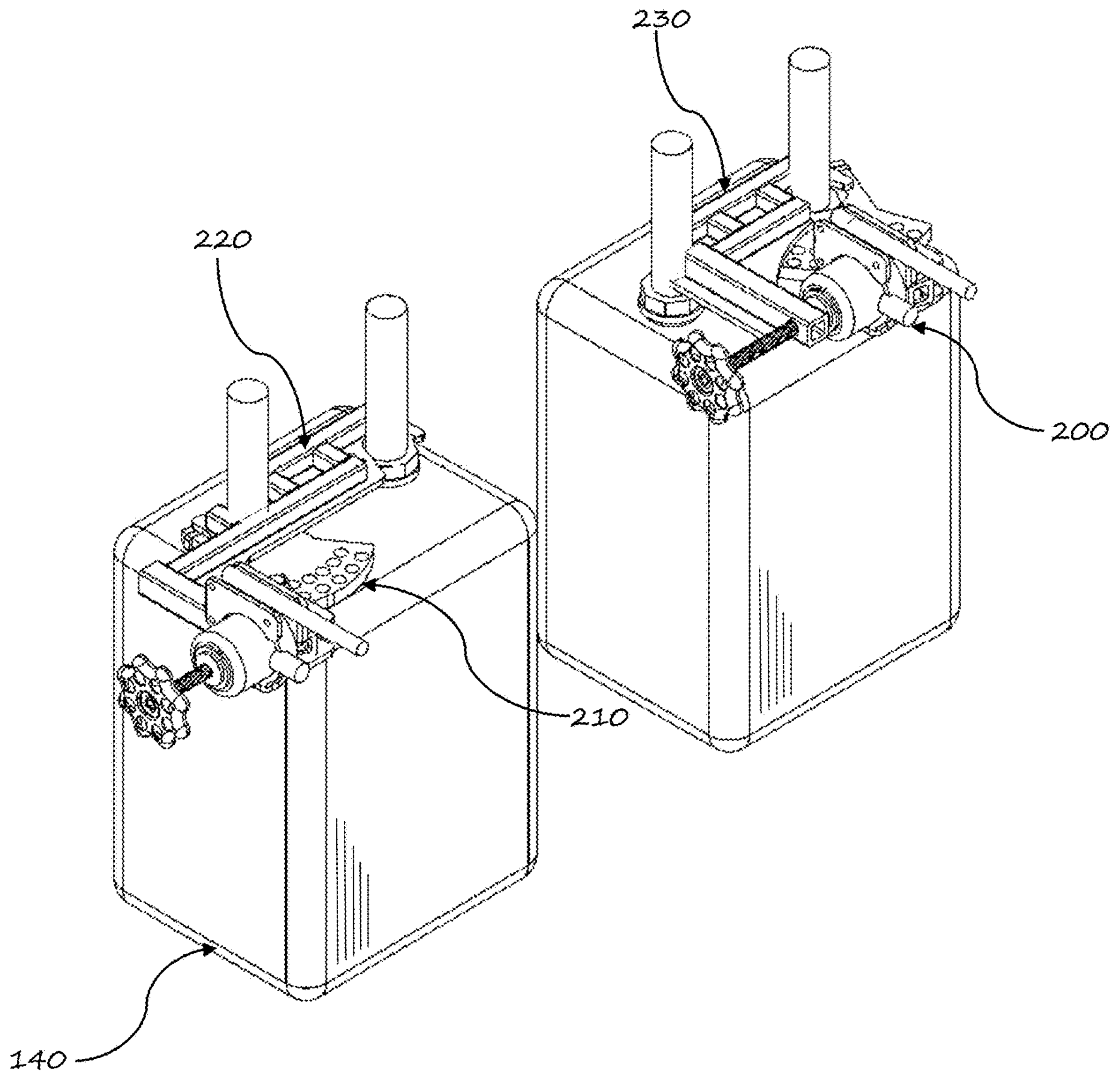
FIG. 10 is a perspective view showing all components of alternative union release tools and a filter (or meter) on which the union release tools may be used, according to a second illustrative embodiment of the invention.

The second illustrative embodiment of a union release tool is shown in FIGS. 10-14. In the second illustrative embodiment, with reference particularly to FIG. 10, the union release tool generally comprises a hydraulic jack assembly 200, a nut capturing device 210, a left nut reaction arm 220, and a right nut reaction arm 230. In FIG. 10, the union release tools are shown ready to release left and right nuts of a filter 140 with input and output union connections (the union release tool is equally useful for unions at the top of a meter, such as a gas meter). In the illustrative embodiment, the union release tool is capable of applying over 2,500 ft.-lbs. of torque to a locked union nut. The union release tool of the second illustrative embodiment utilizes hydraulics to provide the force. The second embodiment provides greater forces to break the nuts loose, if needed (FIGS. 10-14).

In FIG. 10, the main components are shown configured as used to release the unions. The assembly on the right side of FIG. 10 details the release of a right union, while the assembly on the left side of FIG. 10 details the release of a left union.

Figure 11:
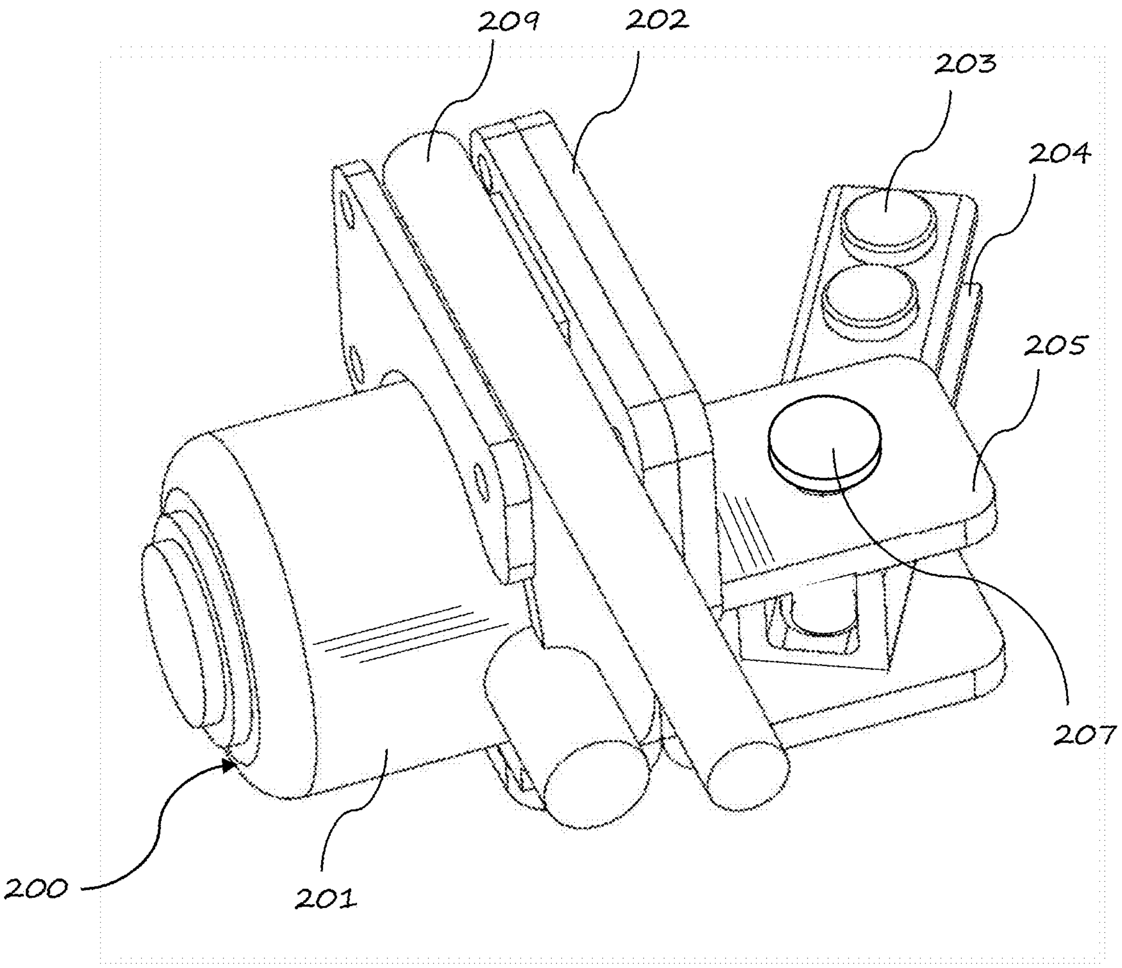
FIG. 11 is a perspective view of a hydraulic jack assembly of the union release tools of FIG. 10.

In the illustrative embodiment, referring to FIG. 11, the hydraulic jack assembly 200 utilizes a hydraulic jack or pump 201 with a highlighted pump arm 209. In the illustrative embodiment, the hydraulic jack assembly 200 further comprises mounting brackets 202 and pivot brackets 205. These items are bolted or welded together to capture the hydraulic jack. In the illustrative embodiment, the hydraulic jack assembly 200 is capable of generating approximately 5 tons of force. The jack shown is one of many hydraulic expanding lift devices that may be used. A reaction arm 204 is also included with the hydraulic jack assembly 200 and comprises a pivot pin 207 and squaring lock pins 203. The hydraulic jack assembly 200 will attach to the nut capturing device 210 in a position dictated by the position of the union flats to provide the force to break the union loose.

Figure 12:
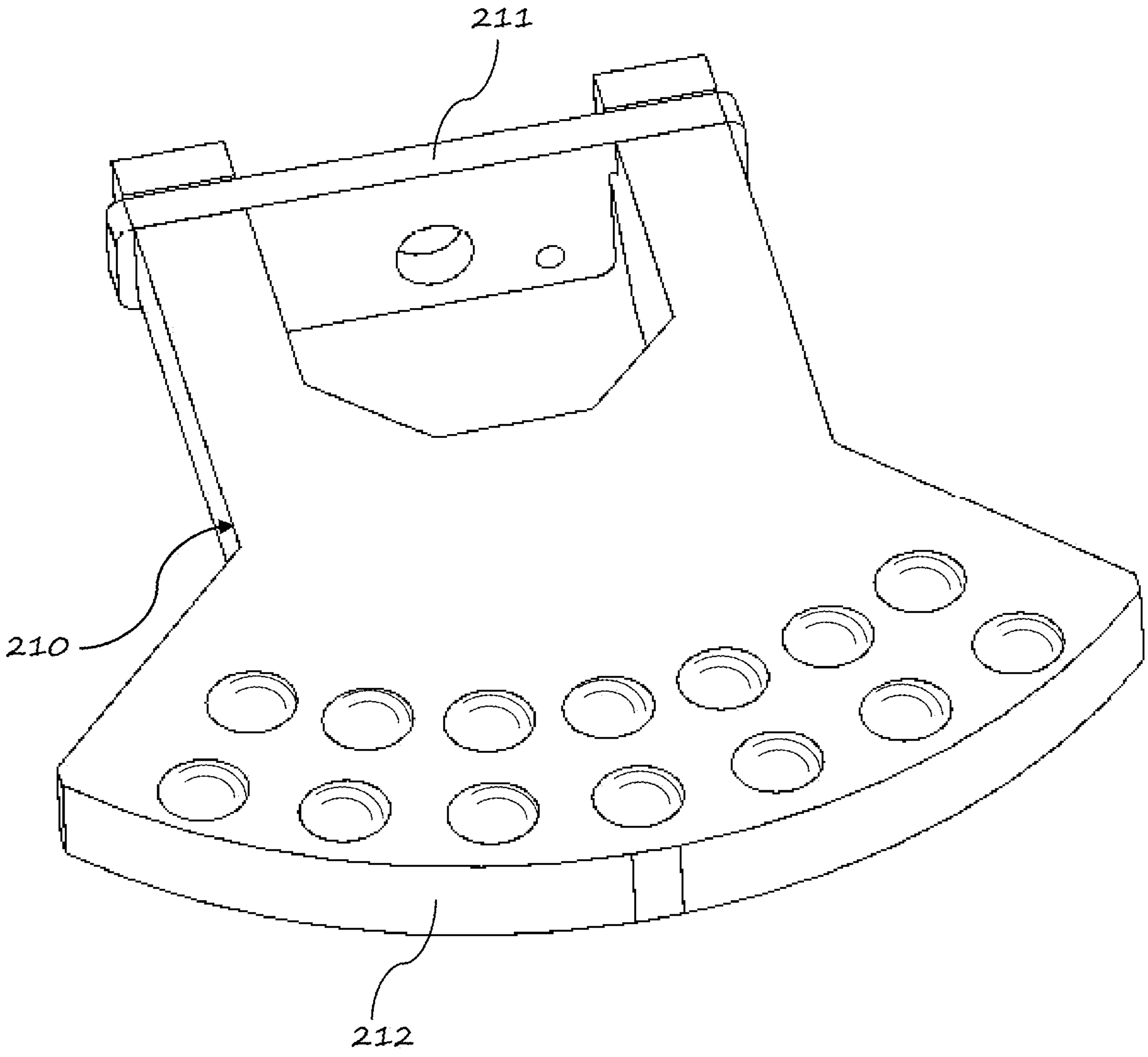
FIG. 12 is a perspective view of a nut capturing device of the union release tools of FIG. 10.

In the illustrative embodiment, referring to FIG. 12, the nut capture device 210 comprises lock tab 211 and the nut capturing/orientation plate 212 (i.e., a slip-on capturing member) with a plurality of spaced-apart apertures defining a plurality of respective extended pivot points relative to a rotation of the union nut. In the illustrative embodiment, the nut capturing/orientation plate 212 is in a form of a machined base of five (5) sides with an extended arm to turn an applied force into rotational torque. The lock tab 211 captures the eighth side of the nut as a drop plate. The nut capture device 210 as shown is configured to capture an eight sided nut on six of eight sides, enabling the device to slip on and slip off. This item can be configured to meet the requirements of any nut.

Figure 13:
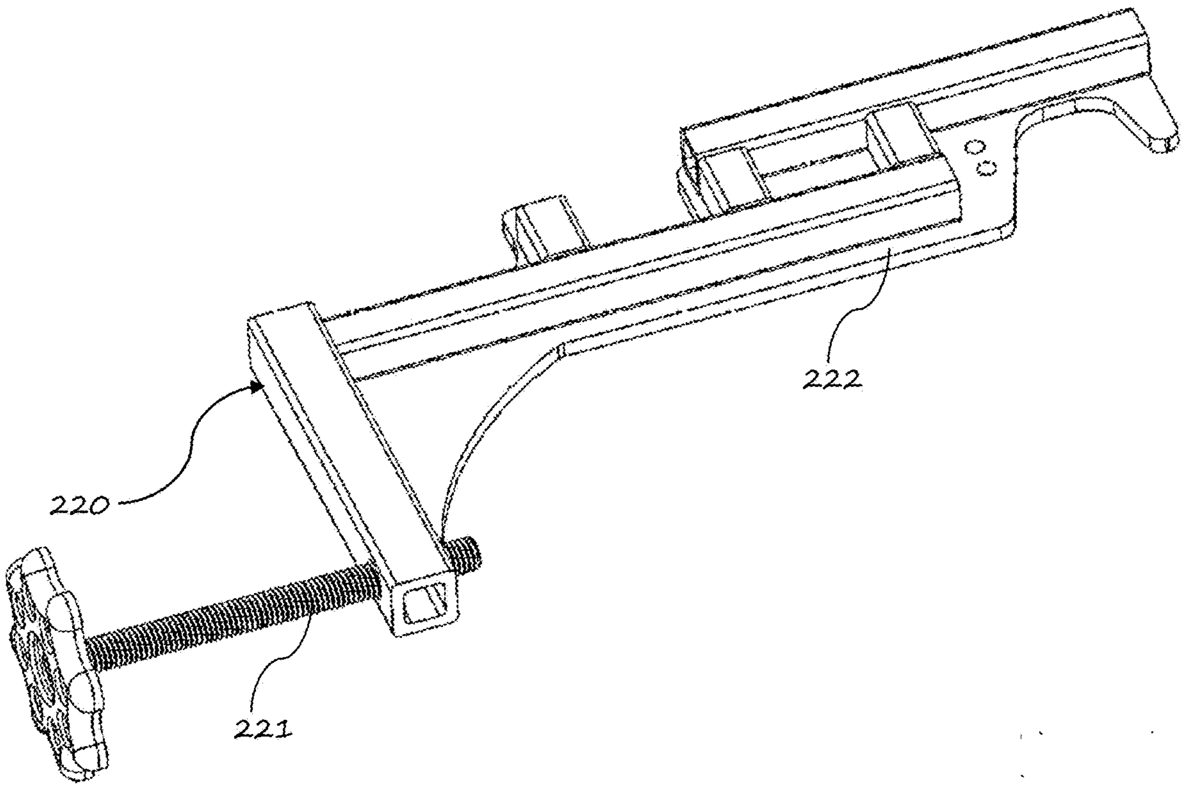
FIG. 13 is a perspective view of a left side nut reactionary arm of the union release tools of FIG. 10.

In the illustrative embodiment, referring to FIG. 13, the left nut reaction arm 220 comprises a threaded slack remover 221 and a left reaction plate/support 222 with a pipe capturing recess. The left reaction plate/support 222 resists the force applied by the hydraulic jack assembly noted above. The threaded slack remover 221 comprises a threaded rod and handle to allow any slack be taken up when installed on a left union.

Figure 14:
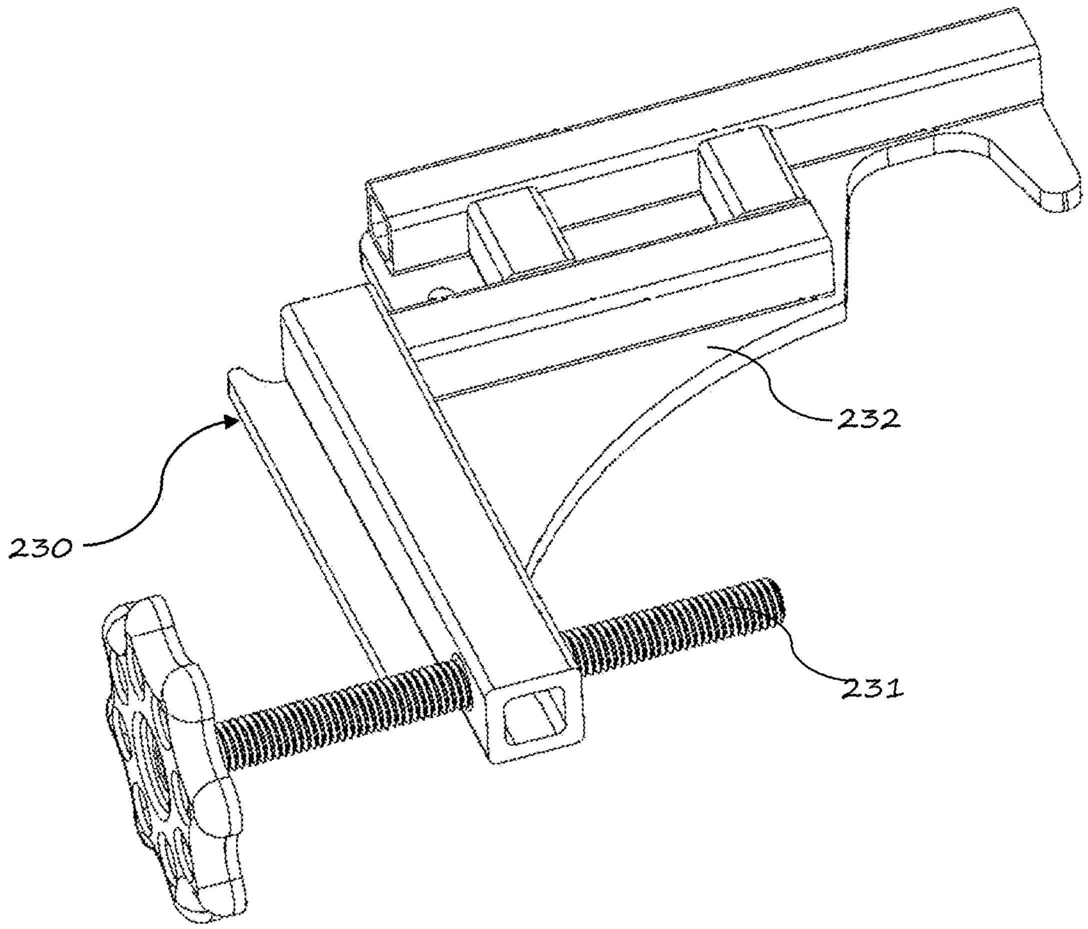
FIG. 14 is a perspective view of a right side nut reactionary arm of the union release tools of FIG. 10.

In the illustrative embodiment, referring to FIG. 14, the right nut reaction arm 230 comprises a threaded slack remover 231 and a right reaction plate/support 232 with a pipe capturing recess. The right reaction plate/support 232 resists the force applied by the hydraulic jack assembly noted above. The threaded slack remover 231 comprises a threaded rod and handle to allow any slack be taken up when installed on a right union.

Exemplary Operation of the Second Embodiment

Now, an example of the operation of the second illustrative embodiment of the union release tool for a right nut will be described. First, the user installs the nut capturing device 210 on the right nut by slipping it around the pipe and over the flats of the nut. The holes in the nut capturing device for the squaring lock pins are to be in a position to allow the squaring locking pins to be near in-line with the pipe and near perpendicular to the face of the device. This allows for the most torque to be generated during operation. Then, the user locks it in place with the drop-in locking plate 211. After which, the user sets the reactionary device 230 into place around the pipes and on top of the nut capturing device 210. The threaded rod is backed out using the attached handle. Next, the user installs the hydraulic jack assembly 200. The threaded rod will be inserted into the opening on the end of the hydraulic jack. The reaction arm is aligned with a pair of holes on the nut capturing device and both squaring lock pins are set. The threaded rod is used to remove any play and take out any slack in the assembled system. When operating the hydraulic jack, all force should be applied in breaking the nut loose. Pumping the jack will cause the jack rod to extend, converting that force to the torque on the nut. The user continues until the nut is loose.

The operation is similar for the left nut removal. The user utilizes the left nut reactionary arm 220 in conjunction with the nut capturing device 210 and the hydraulic jack assembly 200.

It is readily apparent that the aforedescribed union release tool offers numerous advantages. First, the union release tool provides a means to apply large amounts of controlled torque to a nut. Secondly, the release tool results in a safer working environment by enabling the release of the nut with little physical effort in a controlled manner. Advantageously, the union release tool is capable of breaking loose hard to remove union nuts (e.g., which are stuck in place due to corrosion or other factors) in a safe, stable, and low effort manner.

Advantageously, the above-described union release tool is lightweight, simple in the field installation and operation, and there is no requirement of external pneumatic, electric, or hydraulic energy. In the illustrative embodiment, less than 20 pounds of force are able to operate the release tool in a safe, controlled manner, thus making this an improvement over current methods of removal. The aforedescribed union release tool is able to break loose hard to remove union nuts without compromising the integrity of the joint, and providing a safe operating environment for the operator.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A union release tool for loosening union nuts, the tool comprising:

a nut capturing device, the nut capturing device including a slip-on capturing member for circumscribing a plurality of sides of a union nut, the nut capturing device configured to provide an extended pivot point relative to the rotation of the union nut;

a jack assembly, the jack assembly configured to produce a force for breaking the union nut loose, and the jack assembly being operatively coupled to the nut capturing device so as to convert the force produced by the jack assembly to a torque applied to the union nut; and at least one reactionary device, the at least one reactionary device configured to resist the force applied by the jack assembly to facilitate the breaking of the union nut loose, and the at least one reactionary device defining at least one pipe capturing recess for receiving a portion of a pipe in the pipe capturing recess;

wherein the jack assembly is in a form of a screw jack assembly, the screw jack assembly configured to produce a linear output force as a result of a rotational input force, the screw jack assembly including a threaded rod and a plurality of dowels for pivots, one of the plurality of dowels being threaded for traveling along a length of the threaded rod.

2. The union release tool according to claim 1, wherein the nut capturing device further comprises an end piece that captures the remaining sides of the union nut that are not captured by the slip-on capturing member.

3. The union release tool according to claim 1, wherein the nut capturing device further comprises a fork attached to the slip-on capturing member and one or more V-blocks supported on the fork, the one or more V-blocks configured to receive a component of the jack assembly.

4. The union release tool according to claim 1, wherein the slip-on capturing member of the nut capturing device is in a form of a plate with a plurality of spaced-apart apertures disposed through the plate, and the plurality of spaced-apart apertures in the plate define a plurality of respective extended pivot points relative to a rotation of the union nut.

5. The union release tool according to claim 1, wherein the threaded rod of the screw jack assembly comprises a first drive end and an oppositely disposed second end, and the threaded rod is configured to be rotated with a ratchet or wrench applied to the first drive end of the threaded rod.

6. The union release tool according to claim 1, wherein the at least one reactionary device comprises a first elongate member telescopically received in a second elongate member so as to allow the at least one reactionary device to accommodate various pipe spacing.

7. The union release tool according to claim 6, wherein the linear output force generated by the screw jack assembly results in the first and second elongate members of the at least one reactionary device rotating relative to one another, thereby causing the first and second elongate members of the at least one reactionary device to lock together.

8. The union release tool according to claim 1, wherein the at least one reactionary device is configured to grasp two pipes of an item being serviced while self-locking into place as external forces are applied, the at least one reactionary device being ambidextrous such that the at least one reactionary device is able to provide a reactionary force in opposite directions as needed in an application.

9. The union release tool according to claim 8, further comprising a quick-adjust nut, a spring, or bungee cord to assist in keeping reaction arms of the at least one reactionary device together, the quick-adjust nut, spring, or bungee cord configured to apply force to encourage a binding of the reaction arms.

10. The union release tool according to claim 8, wherein the at least one reactionary device comprises a first plate member and a second plate member, wherein the first and second plate members are configured to capture respective pipes on oppositely disposed sides to maintain a grip on the pipes while reactionary forces are applied on either side of the at least one reactionary device.

11. The union release tool according to claim 1, wherein the at least one reactionary device includes a reaction arm configured to be disposed between one or more nuts and a pipe of an item being serviced that has one or more unions, and the at least one reactionary device further including an adjustable locator to allow for different nut orientations and supports to manage the forces needed to break the union nut loose.

12. The union release tool according to claim 11, wherein the at least one reactionary device comprises a right nut reactionary device and a left nut reactionary device, the right nut reactionary device configured to be used for breaking a union nut loose on a right side of the item being serviced, and the left nut reactionary device configured to be used for breaking a union nut loose on a left side of the item being serviced.

13. A union release tool for loosening union nuts, the tool comprising:

a nut capturing device, the nut capturing device including a slip-on capturing member for circumscribing a plurality of sides of a union nut, the nut capturing device configured to provide an extended pivot point relative to the rotation of the union nut;

a jack assembly, the jack assembly configured to produce a force for breaking the union nut loose, and the jack assembly being operatively coupled to the nut capturing device so as to convert the force produced by the jack assembly to a torque applied to the union nut; and at least one reactionary device, the at least one reactionary device configured to resist the force applied by the jack assembly to facilitate the breaking of the union nut loose, and the at least one reactionary device defining at least one pipe capturing recess for receiving a portion of a pipe in the pipe capturing recess;

wherein the at least one reactionary device is configured to grasp two pipes of an item being serviced while self-locking into place as external forces are applied, the at least one reactionary device being ambidextrous such that the at least one reactionary device is able to provide a reactionary force in opposite directions as needed in an application.

14. The union release tool according to claim 13, further comprising a quick-adjust nut, a spring, or bungee cord to assist in keeping reaction arms of the at least one reactionary device together, the quick-adjust nut, spring, or bungee cord configured to apply force to encourage a binding of the reaction arms.

15. The union release tool according to claim 13, wherein the at least one reactionary device comprises a first plate member and a second plate member, wherein the first and second plate members are configured to capture respective pipes on oppositely disposed sides to maintain a grip on the pipes while reactionary forces are applied on either side of the at least one reactionary device.

16. A union release tool for loosening union nuts, the tool comprising:

a nut capturing device, the nut capturing device including an arm portion and a slip-on capturing member for circumscribing a plurality of sides of a union nut, the arm portion comprising a fork attached to the slip-on capturing member and one or more recesses, the nut capturing device configured to provide an extended pivot point relative to the rotation of the union nut;

a jack assembly, the jack assembly configured to produce a force for breaking the union nut loose, and the jack assembly being operatively coupled to the nut capturing device so as to convert the force produced by the jack assembly to a torque applied to the union nut, the jack assembly configured to rotate the arm portion of the nut capturing device about a rotational axis disposed in a center of the union nut, wherein the component of the jack assembly is received within the one or more recesses of the arm portion of the nut capturing device; and at least one reactionary device, the at least one reactionary device configured to resist the force applied by the jack assembly to facilitate the breaking of the union nut loose, and the at least one reactionary device defining at least one pipe capturing recess for receiving a portion of a pipe in the pipe capturing recess.

17. The union release tool according to claim 16, wherein the nut capturing device further comprises an end piece that captures the remaining sides of the union nut that are not captured by the slip-on capturing member.

18. The union release tool according to claim 16, wherein the arm portion of the nut capturing device further comprises one or more V-blocks supported on the fork, the one or more V-blocks defining the one or more recesses receiving the component of the jack assembly.

19. The union release tool according to claim 16, wherein the at least one reactionary device comprises a first elongate member telescopically received in a second elongate member so as to allow the at least one reactionary device to accommodate various pipe spacing.

20. The union release tool according to claim 16, wherein the jack assembly is in a form of a hydraulic jack assembly, the hydraulic jack assembly configured to produce the force for breaking the union nut loose, and the hydraulic jack assembly being operatively coupled to the nut capturing device so as to convert the force produced by the hydraulic jack assembly to the torque applied to the union nut.

* * * * *